Jan. 12, 1971  J. G. WILSON  3,554,903
CATALYTIC CRACKING PROCESS
Filed Dec. 10, 1968
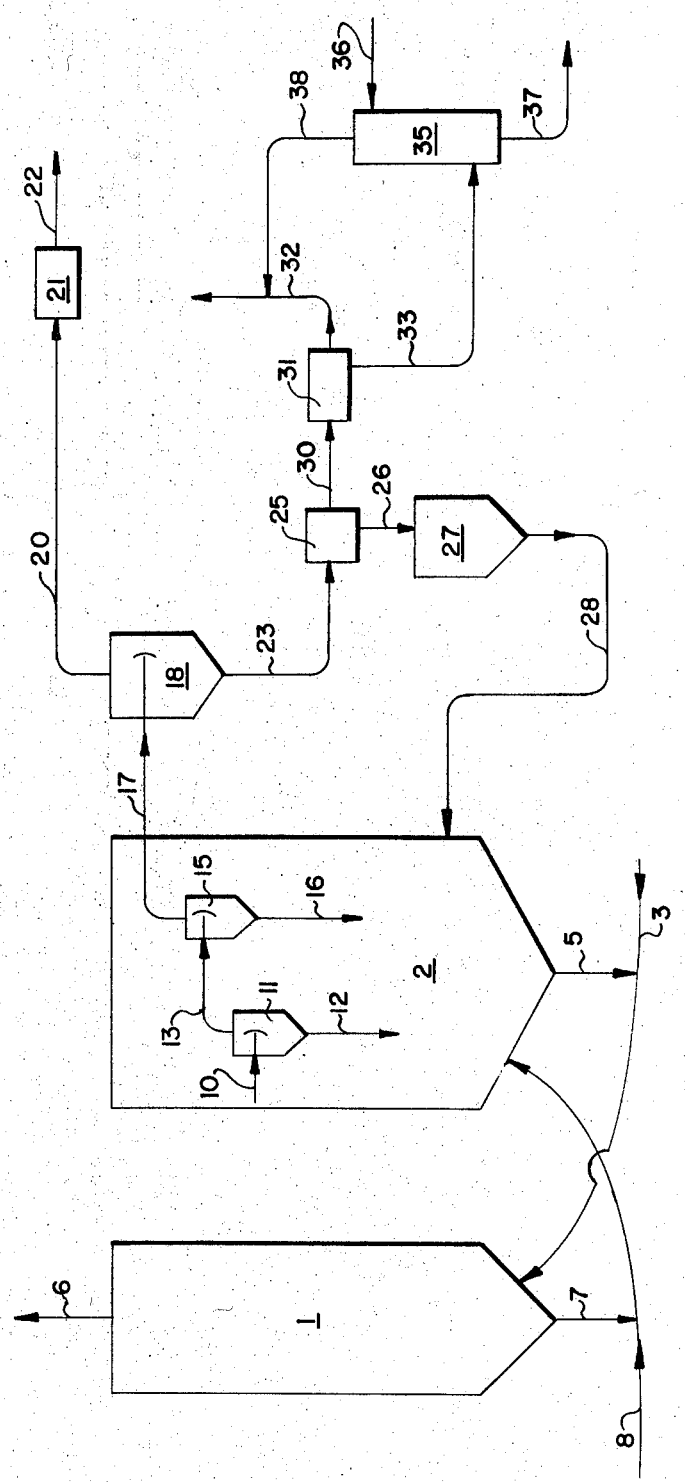
INVENTOR:
JOSEPH G. WILSON
BY:
*Glen R. Grunewald*
HIS ATTORNEY

United States Patent Office 3,554,903
Patented Jan. 12, 1971

3,554,903
CATALYTIC CRACKING PROCESS
Joseph G. Wilson, Riverside, Conn., assignor to Shell Oil Company, New York, N.Y., a corporation of Delaware
Filed Dec. 10, 1968, Ser. No. 782,650
Int. Cl. C10g 11/18
U.S. Cl. 208—164                3 Claims

ABSTRACT OF THE DISCLOSURE

A catalytic cracking process having high catalyst activity and low catalyst consumption, effected by separating substantially all entrained catalyst particles from the regenerator off-gas stream, classifying the particles into a larger particle fraction and a smaller particle fraction, and returning the larger particle fraction to the catalytic cracking process.

BACKGROUND

For many years fluidized catalytic cracking has been empolyed to convert higher boiling hydrocarbons to lower boiling hydrocarbons. The fluidized catalytic cracking process has thus far been very successful because of its efficiency in handling large quantities of hydrocarbons and because it converts heavier hydrocarbons predominantly into lighter hydrocarbons in the gasoline boiling range. In the fluidized catalytic cracking process a particulate catalyst entrained in gas streams circulates between a reactor and a regenerator and the mechanical attrition of this circulation, along with thermal shock and other factors, causes production of fines. In the regenerator the large gas flow through the bed of particles causes catalyst particles to become entrained in the gas stream passing from the regenerator, and although the entrained particles contain a disproportionate amount of fines compared with the general size range of the catalyst inventory, particles of all sizes appear in the regenerator off-gas stream. Particles are also blown from the reactor, but to a far lesser degree.

It is beneficial to remove particles from the regenerator gas. The benefit derives from returning catalyst to the process and from avoiding air pollution. In recent years it has also been necessary to clean the regenerator off-gas to a high degree because the gas is expanded through a turbine for power recovery, and entrained catalyst particles in the gas create severe erosion problems in the turbine.

Present day catalytic cracking processes have several stages of particle separation within the regenerator. These separators are normally inefficient and tend to reduce the total catalyst particle loading of the gas without being too discriminating as to the sizes of the particles that are removed. Again, there is a natural classification because smaller particles pass through the particle separators more easily than larger particles, but the stream emerging from the regenerator entrains particles of widely varying sizes. This stream passes through a main particle separator which removes substantially all catalyst particles from the regenerator gas stream and only those particles that are so small or so few in number as to present no serious erosion problem to turbine blades and no pollution problem to the atmosphere are entrained in the overflow gas stream from the main particle separator. The underflow particle stream from the main particle separator is usually entrained in water and passed to a settling pond where the solids eventually deposit on the bottom in a form that can be handled and disposed of easily. Removing of solids from the regenerator off-gas must be accompanied by addition of a corresponding amount of fresh catalyst to the process in order to maintain the inventory of catalyst in the system. The addition of fresh catalyst to replace particles entrained in the regenerator gas is generally considered to be a good method to maintain equilibrium catalyst activity high. Equilibrium catalyst activity is the average activity of the catalyst when operation of the process is at steady state condition.

THE INVENTION

This invention deals with the discovery that when the particles of catalyst in the underflow from the main particle separator are classified, and the larger particles from this stream are returned to the catalytic cracking process, the larger particles serve as a high activity catalyst stream that can be used in place of fresh catalyst. Several important benefits flow from this discovery.

Primarily, the invention provides a high activity catalyst stream to the process that does not have to be purchased, and by using this stream the catalyst activity level in the catalytic cracking process can be maintained at a relatively low cost. Another benefit of this invention is that spent catalyst disposal costs are significantly reduced because the high activity larger particle stream from the main catalyst separator, in being returned to the catalytic cracking process, does not have to be entrained in water, settled, recovered, and disposed of.

Still another benefit flowing from the present invention is that the return of catalyst to the process after smaller particles are separated does not overload the particle separating devices of the process by circulation of fines which tend to accumulate as entrained particles in the gas streams. Not only do fines overload particle separating devices, but they add little benefit to the process as catalyst, since they are relatively inactive and they tend almost immediately to blow out of the system and accordingly the residence time of fines in the system is too short to promote any significant amount of cracking reaction.

As will be demonstrated in the following example, classifying the underflow from the main particle separator and returning the larger particles to the catalytic cracking process provides a catalyst stream of unexpectedly high activity, so high in fact that returning this fraction of particles to the reactor is almost equivalent to adding fresh catalyst. As will also be demonstrated in the following example, the process of this invention used in a medium-sized catalytic cracking unit saves thousands of dollars each day in catalyst costs. It is also to be emphasized that significant additional savings that are difficult to calculate are also realized by such factors as reduced waste disposal costs, lesser maintenance costs on particle separating equipment and other such factors.

The process of this invention can be better explained by reference to the accompanying drawing which illustrates schematically a flow diagram of a process embodying this invention.

Referring to the drawing, a fluidized catalytic cracking reactor vessel 1 operates in conjunction with a regenerator vessel 2. Reactions are effected in reactor 1 when hydrocarbon introduced through line 3 contacts catalyst which passes in hot active condition from regenerator 2 through line 5 and is entrained in vapor phase hydrocarbon in line 3 and passed into the lower portion of reactor 1. In reactor 1 a fluidized bed of catalyst promotes cracking reactions and the resultant lower boiling hydrocarbon products are recovered through line 6. In the course of promoting the cracking reactions a carbonaceous deposit forms on the catalyst which reduces its activity, and spent catalyst passes through line 7 and is entrained in an oxygen containing gas stream, usually air, passing through line 8 and carrying entrained catalyst particles into the lower portion of regenerator 2.

The reaction between carbonaceous deposits and oxygen cause the deposits to be removed from the catalyst thereby regenerating it as hot, active catalyst capable of promoting cracking reactions. Regeneration produces a large volume gas stream containing nitrogen, carbon oxides, and small amounts of other gases, which is removed from the regenerator.

It is desirable for initial particle separation from the gas to take place internally within regenerator 2, and accordingly, the gas passing from regenerator 2 passes through a line 10 and tangentially enters cyclone separator 11. The particle laden underflow stream from separator 10 passes through dip leg 12 to a position below the level of the fluidized bed in regenerator 2 and the less heavily particle laden stream overflowing from separator 11 passes through line 13 and enters particle separator 15 tangentially. In particle separator 15 another centrifugal separation is effected and a heavily particle laden underflow stream passes through dip leg 16 while a less particle laden overflow stream passes from the regenerator through line 17.

The stream in line 17 is subjected to a severe particle separation in main particle separator 18 to produce a substantially particle-free overflow stream 20 that is suitable for expansion through a power recovery unit shown schematically as 21 and disposal to the atmosphere through line 22. The underflow from main particle separator 18, consisting of substantially all of the particles in line 17, passes through line 23 to a particle classifier 25.

In particle classifier 25 larger particles are separated from smaller particles. The larger particles pass through line 26 to a catalyst hopper 27 and from there periodically through line 28 to be added to the catalytic cracking system when appropriate. The catalyst from line 28 is shown being added to the regenerator which is a convenient manner for adding catalyst to the system so that it contacts the oil to be cracked at a high temperature.

The overflow stream from classifier 25 contains gas and the smaller particles that were in the underflow stream from separator 18. The overflow passes through line 30 into a final separator 31 that is designed and operated to remove substantially all particles from the gas stream thereby resulting in a clean gas passing through line 32 which may discharge into the atmosphere, and a heavily laden particle stream passing through line 33 into the lower portion of a spray tower 35. In spray tower 35 the particle laden gas stream rises and is cleaned by a spray of water entering through line 36 resulting in a clean gas discharging through line 38 which may join the stream in line 32, and a slurry passing from line 37 to a settling pond or other apropriate means for clarifying the slurry.

EXAMPLE

A catalytic cracker that required fresh catalyst input of 5.6 tons per day, through the use of the present invention, reduced the fresh catalyst requirements by 4.4 tons per day with catalyst recycle from hopper 27 added through line 28. The particle load on the main separator, that is the particles passing through line 17, amounted to 5.1 tons per day of which 4.5 tons per day were removed through line 23 and 0.6 ton per day were removed through line 20. The material in line 20 was 66% by weight smaller than 11 microns. The overflow from classifier 25 contained only 0.1 ton per day of particles and the overflow from this final separator, that is the stream exiting through line 32, contained only 0.03 ton per day of particles of which 99% were smaller than 11 microns. The underflow from final separator 31 contained particles in substantially all size ranges. However, 30% of the particles in the underflow were smaller than 11 microns. Therefore, substantially all of the particles 11 microns and larger were recovered and returned to the catalytic cracking process and substantially all of the particles 11 microns and smaller were removed in the underflow from the final separator, and only particles in the range of 11 microns and smaller were present in any substantial quantity in the gas stream passing through the turbine 21 and exiting through line 22 to the atmosphere.

At catalyst costs of approximately $350 per ton, a daily saving in fresh catalyst of about $1,500 was realized by the process of this invention when applied to the particular catalytic cracking process described herein.

Although catalyst activity is a difficult property to measure, it has been found that for a catalyst of a given composition employed with a charge stock of given composition, the surface area of the catalyst is a fairly accurate measure of its activity. Using this criterion of catalyst activity, with certain qualifications set forth below, measurements of catalyst surface areas of various catalyst streams were found to be as follows.

| Surface area of catalyst streams: | Surface area (sq. m./g.) |
| --- | --- |
| Equilibrium catalyst (regenerator bed) | 75 |
| Main separator overflow | 40 |
| Classifier underflow (recycle catalyst) | 101 |
| Fresh catalyst | 450 |

As seen from above, the classifier underflow stream, which passes to the catalyst hopper and eventually is returned to the process, has a substantially higher surface area than the equilibrium catalyst, and additions of this catalyst to the process have indeed indicated that it has a correspondingly higher activity. It may also be seen from the above table that fresh catalyst has a much higher surface area than either the equilibrium catalyst or the recycle catalyst. However, it has been found that surface area and activity do not correlate well for fresh catalyst. Before a catalyst can be used for cracking it must be subjected to high temperature and usually to treatment with steam. Both of these conditions cause drastic reductions in surface area. As a result, it is doubtful that the surface area of fresh catalyst is significantly higher than 100 square meters per gram by the time it has passed through one cracking and regeneration cycle. Experience has shown that fresh catalyst additions do not raise the activity of the inventory of catalyst proportionate to the surface area whereas recycle catalyst additions made in accordance with this invention do. Accordingly, additions of recycle catalyst are almost equivalent to additions of fresh catalyst with regard to the effect of such additions on equilibrium catalyst activity. Fresh catalyst has a slightly greater activity, but it also produces a higher volume of fines in that it is more subject to attrition and thermal shock than recycle catalyst. The surface area of fines, that is catalyst particles smaller than 11 microns, is extremely low, in the region of 30–40 meters per gram, and it is accordingly desirable in a preferred embodiment of this invention to discard particles smaller than 11 microns and to recirculate particles larger than 11 microns.

In discussing particle sizes, it is intended that the inability to make complete separations is an inherent limitation of the discussion. Thus, when a particle fraction smaller than 11 microns is discussed, it means that substantially all particles in the fraction are smaller than 11 microns, but the fraction so identified may include some particles larger than 11 microns. Of course, the fraction larger than 11 microns will include a small insignificant amount of particles smaller than 11 microns. In other words, inherent in the above-identified fractions is the ability of classifying devices to make clean separations.

I claim as my invention:

1. In a fluidized catalytic cracking process wherein particulate catalyst is circulated between a reactor and a regenerator and in the regenerator said catalyst is regenerated by being maintained as a fluidized particle bed in an oxygen-containing gas stream, the improvement which comprises:

(A) removing substantially all particles from the gas stream flowing from the regenerator,
   (B) classifying the particles removed therefrom into a larger particle fraction comprising substantially particles larger than 11 microns and a smaller particle fraction, and (C) returning the larger particle fraction to the catalytic cracking process.

2. Claim 1 wherein the gas stream flowing from the regenerator is expanded through power a generating turbine after particles are removed therefrom.

3. Claim 1 wherein the smaller particles fraction is entrained in water to produce a clean gas.

References Cited

UNITED STATES PATENTS

| | | | |
|---|---|---|---|
| 2,356,717 | 8/1944 | Williams | 208—161 |
| 2,421,212 | 5/1947 | Medlin | 208—152 |
| 2,437,352 | 3/1948 | Fragen | 208—161 |
| 2,515,371 | 7/1950 | Jewell | 208—161 |
| 2,605,214 | 7/1952 | Galstaun | 208—152 |
| 2,631,968 | 3/1953 | Peery | 208—152 |
| 2,689,825 | 9/1954 | McKinley | 208—152 |
| 2,845,383 | 7/1958 | Bowles et al. | 208—152 |

HERBERT LEVINE, Primary Examiner

U.S. Cl. X.R.

208—152